United States Patent Office 2,793,051
Patented May 21, 1957

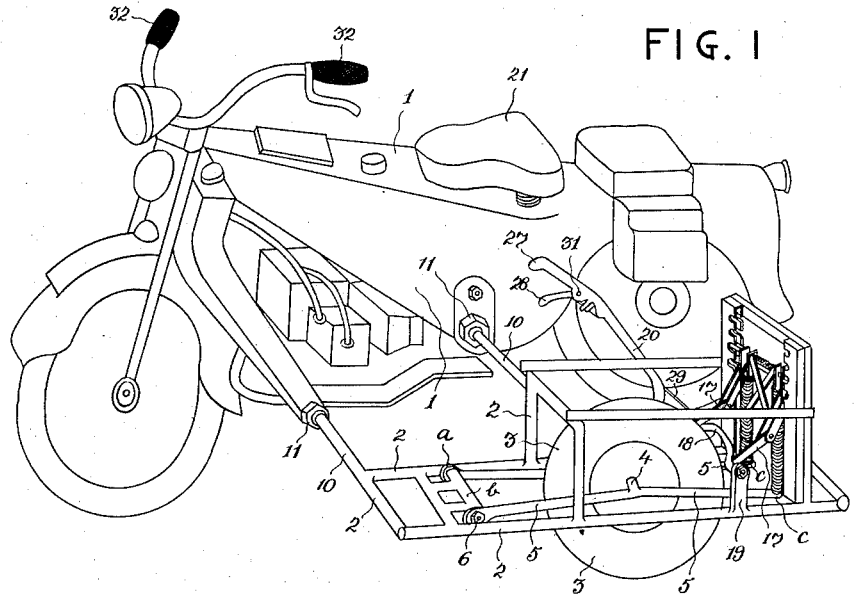

2,793,051

APPARATUS FOR REGULATING THE STABILIZATION OF MOTOR CYCLE WITH SIDE CAR

Kichinojyo Izumi, Yotsugaido-machi, Inba-gun, Japan

Application April 27, 1955, Serial No. 504,334

5 Claims. (Cl. 280—203)

The present invention relates to an apparatus for regulating the stability of a motor cycle with a side car and more particularly to a device for moving the side car body vertically relative to its wheel so that in case of change of side car load or inclination of the road the side car body may be kept at a nearly constant position and in the case of a change of direction by turning the centrifugal force may be opposed by slanting the motor cycle body to the inside of the turn to prevent its overturning.

In hitherto known constructions the motor cycle body and the side car body with its frame and wheel are permanently fixed relative to each other and therefore on inclined and rough roads the motor cycle with its side car slants to the right or left together as one unit and the ease of operating and turning the handle bars is impeded giving rise to the danger of overturning, or rolling over due to the change or shifting of position of the center of gravity because of the change of loading on the side car and the effect of centrifugal force in case of a rapid change of direction such as in making a sharp turn.

According to the present invention the side car wheel is not permanently fixed to the side car frame which in turn is fixed to the motor cycle but is able to be adjusted and moved vertically relative to the side car frame. When the motorcycle comes to an inclination of the road or in case of a change in side car loading or a change in direction the driver can by controlling a regulating handle, move the side car frame vertically relative to the side car wheel. In other words, he can easily slant the motor cycle with the side car frame against and in opposite direction to the slanting caused thereby and maintain the surface of the roads, and in any case can hold a position of equilibrium, so it can be easily driven and overturning, rolling, and the like are avoided.

A preferred constructional embodiment of my invention is illustrated by way of example in the accompanying drawings, in which:

Fig. 1 is a perspective view of a motor cycle with side car equipped with the regulating and stabilizing apparatus in accordance with the present invention;

Fig. 2 is a partial perspective view of the regulating apparatus;

In this embodiment, a motor cycle equipped with a side car frame 2 has a side car wheel 3 directly beneath the center line of the frame 2, therefore almost all the weight of the side car, side car frame and that of the load on the side car are supported on the wheel 3.

Figure 3:
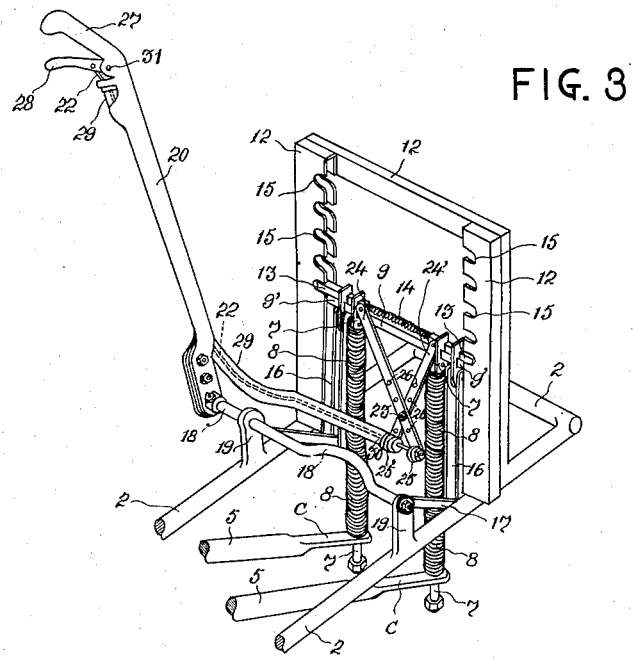
Fig. 3 is a partial perspective view showing the position in which wheel-supporting levers are pushed downwardly by adjustably shifting the regulating apparatus.

A shaft 4 of the wheel 3 is supported by levers 5, and the front ends $a$ thereof are fixed to a rotatable shaft 6 which is inserted in a tube shaped bearing $b$ of the side car frame 2. The rear ends $c$ of the shaft supporting levers 5 are connected to a lifting frame 9 through connecting levers 7 and resilient coil springs 8 are mounted surrounding each of the levers, so that the lower ends $c$ can move freely in a vertical direction relative to the lifting frame 9 having a horizontal bar portion, as shown in Fig. 2 and Fig. 3, and consequently the side car wheel 3 and its shaft 4 are able to move in a vertical direction relative to the side car frame 2. Two supporting levers 10 projecting from the side car frame 2 support the side car frame 2 on one side of the motor cycle body as shown and are fastened by nuts 11.

Figure 4:
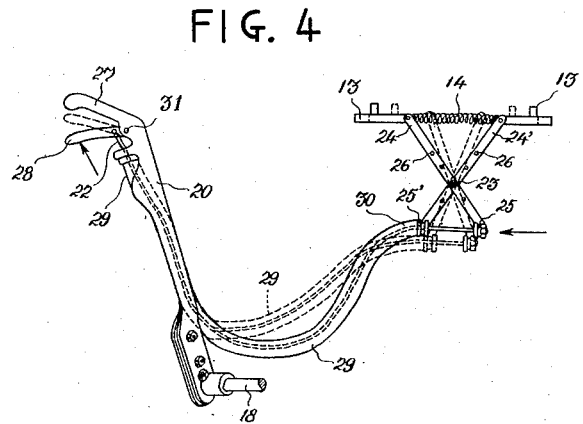
Fig. 4 is a partial schematic perspective view showing the condition in which use of a flexible lever for engaging and disengaging the apparatus in accordance with the invention.

The lifting frame 9 bar portion is arranged so as to be able to move along in the channel of a vertical guide frame 12 which is positioned vertically on the side car frame 2. Above its ends 9' claw members or fingers 13 slide freely in a horizontal direction and are reciprocable thereon being pushed outwardly by means of a spring 14 interposed between the fingers. A plurality of notches of the saw tooth type 15 are provided along the guiding side of the vertical guide frame 12 and are engaged by fingers 13. The lifting frame 9 is connected, through two sets of connecting levers 16 and 17 to a rotatable shaft 18 which is carried oscillatably on the side car frame 2 by means of upward extending supporting arms 19. A regulating or control handle 20 is fitted at one end of the rotatable shaft 18. The handle is situated near one side of a driver's seat 21 of the motor cycle 1. A cable or flexible lever 22, as for example a "Bowden" cable, used for engaging and disengaging the fingers or claw members 13 is guided along the regulating handle, through a flexible tube or sheath 29. The lower end of two rocking levers 24 and 24' are connected to the end of the cable 22 by means of a connector or adapter 25 and a stop-connector 25'. The rocking levers 24 and 24' are arranged crosswise in X form so as to be able to move freely round a supporting center pin 23 and both of their upper ends are connected to the fingers 13 respectively. Accordingly when the flexible lever 22 is in a downwardly bent and released position as shown in solid lines in Fig. 4, the flexible tube 29 and the flexible lever 22 bring the rocking levers 24 and 24' to an open position so that the fingers 13 slide outwardly by means of the spring action of the spring 14 and thus engage the notches 15. When the driver holds the holding part or grip 27 of the regulating handle 20 together with a pulling end or actuating lever 28 connected to cable 22, the flexible sheath 29 is displaced to an upper and extended position and the cable 22 is pulled into a position as shown in dotted lines in Fig. 4. The rocking lever 24 is rocked in such a direction as to release the finger 13 from the notch 15 by overcoming the spring pressure of the elastic spring 14. The other rocking lever 24' is rocked in a direction so that it engages and contacts the end 30 of the flexible sheath 29 and the stop 25'; consequently the two rocking levers 24 and 24' are rocked into a scissor-like action to release the fingers 13 from the notches 15 against the pressure of the spring 14. The above is accomplished, when the driver holds the actuating lever 28 pivoted by a pivot 31 on the lower end of the grip 27 of the handle 20 and rocks it to the direction shown by the arrow in Fig. 4. When the driver lets go his hold of the pulling end 28 and releases the cable 22, the fingers 13 slide outwardly automatically, thus engaging notches 15, due to the action of the elastic spring 14.

Several holes 26 are bored on the rocking levers 24 and 24' at adequate intervals to adjust the supporting position of the center pin 23.

The action of the apparatus is as follows: When the load on the side car is too light or the road on the side car side is higher than the other side so that the side car wheel has a tendency to be pushed up, the driver may hold the pulling end or lever 28 of the cable 22, and thus pull up the cable 22 to disengage the fingers 13 from the engaging notches 15 and then by pushing forwardly on the regulating handle 20 which extends the connecting levers 16 and 17 by means of the rotatable shaft 18, the lifting frame is thus elevated as shown in Fig. 2. He then releases the pulling end or lever 28 at the desired position so that the fingers 13 engage the notches 15. Accordingly the rear ends c of the shaft supporting levers 5 are moved upwards as well as the coil springs 8 and the connecting levers 7 which makes the side car wheel 3 with its shaft 4 move upwards relative to the side car frame 2. As a result the side car and the side car frame 2 are kept always at about a constant position in spite of the change of side car load and the undulation and inclination of the roads so that the motor cycle body is prevented from slanting to the side opposite to that of the side car and is thus stabilized. On the contrary, when the load on the side car and the side car frame 2 is too heavy or the road under the side car is lower than the other side and the side car has a tendency to slant to the lower side, the driver may again hold the lever 28 and pull up the lever cable 22 to disengage the fingers 13 from the engaging notches 15. He then pulls backwards on the regulating handle 20 which turns the connecting levers 16 and 17 through the rotatable shaft 18 to lower the lifting frame 9 as shown in Fig. 3. He subsequently releases the lever 28 at the desired position so that the fingers 13 engage the notches 15. Thus the rear ends c of the shaft supporting levers 5 including the side car wheel 3 with its shaft 4 are moved downwards and the side car and the side car frame 2 are kept at a nearly constant position so that the motor cycle is prevented from slanting to the side car side.

In the case of a rapid change of direction he may shift the regulating handle 20 and move the side car wheel 3 with its shaft 4 to a selected position as above described thus slanting the motor cycle body with the side car frame toward the inside of the turn. Thus the centrifugal force due to the change of direction is opposed by the position of the motorcycle body and overturning of the motorcycle to the outside is prevented.

The embodiment shown by way of illustration has a side car with the side car frame 2 supported by a single center wheel 9; however, I do not desire to limit myself to the particular construction and arrangement of the parts herein shown and described, since it is obvious that many changes can be made without departing from the spirit and scope of my invention as defined in the appended claims. For example the invention can be applied equally to the ordinary designed type in which a second side car wheel is arranged at the outside of the side car frame so that the side car and side car frame are supported by two wheels and the rear wheel of the motorcycle.

What I claim is:

1. In a motorcycle having a fixed sidecar frame, a sidecar and at least one sidecar wheel the combination comprising, a plurality of sidecar wheel-supporting levers having one end pivotally mounted on said sidecar frame and the other end free, a substantially vertical guide frame on said sidecar frame having a plurality of spaced notches, a lifting frame having a transverse bar portion being guided by said guide frame, a plurality of reciprocable fingers guided along said transverse bar portion and extending outwardly from said lifting frame so as to engage said notches, resilient means to keep said reciprocable fingers in normally protruding position, means connecting the free ends of said wheel supporting levers to said lifting frame, driver-operated means connected between said lifting frame and said fingers and said lifting frame, whereby said fingers are disengaged and engaged and said lifting frame is selectively moved upwardly or downwardly.

2. In a motorcycle in accordance with claim 1, in which said resilient means to keep said reciprocable fingers extending outwardly from said frame comprises a spring.

3. In a motorcycle in accordance with claim 1, in which said driver-operated means includes a plurality of scissor-like levers connected to said reciprocable fingers.

4. In a motorcycle in accordance with claim 3, in which said driver-operated means further includes a rotatable shaft mounted on said sidecar frame, a plurality of articulated levers fixed on said shaft and connected to said lifting frame and a driver-operated control handle fixed on said shaft.

5. In a motorcycle in accordance with claim 4, in which said driver operated handle has a pivotally connected actuating lever and a flexible cable connected between said actuating lever and said scissor-like levers.

References Cited in the file of this patent

UNITED STATES PATENTS

| | | |
|---|---|---|
| 1,176,375 | Leach | Mar. 21, 1916 |
| 1,388,387 | Swan et al. | Aug. 23, 1921 |
| 2,707,857 | Bobrowski | May 10, 1955 |

FOREIGN PATENTS

| | | |
|---|---|---|
| 217,754 | Great Britain | June 26, 1924 |
| 466,190 | Italy | Oct. 22, 1951 |